(No Model.)  5 Sheets—Sheet 1.

W. L. PARSLEY.
SUBWAY FOR ELECTRIC CABLES.

No. 431,780.  Patented July 8, 1890.

WITNESSES:  
Louis C. _____  
Marcus J. Hopkins.

INVENTOR.  
Walter L. Parsley  
BY Hopkins & Atkins  
ATTORNEYS.

(No Model.) 5 Sheets—Sheet 2.

W. L. PARSLEY.
SUBWAY FOR ELECTRIC CABLES.

No. 431,780. Patented July 8, 1890.

WITNESSES:

INVENTOR.
Walter L. Parsley.
BY
Hopkins & Atkins
ATTORNEYS.

(No Model.) 5 Sheets—Sheet 3.

W. L. PARSLEY.
SUBWAY FOR ELECTRIC CABLES.

No. 431,780. Patented July 8, 1890.

WITNESSES:

INVENTOR.
Walter L. Parsley.
BY
Hopkins & Atkins
ATTORNEYS.

(No Model.)  5 Sheets—Sheet 4.
W. L. PARSLEY.
SUBWAY FOR ELECTRIC CABLES.
No. 431,780. Patented July 8, 1890.
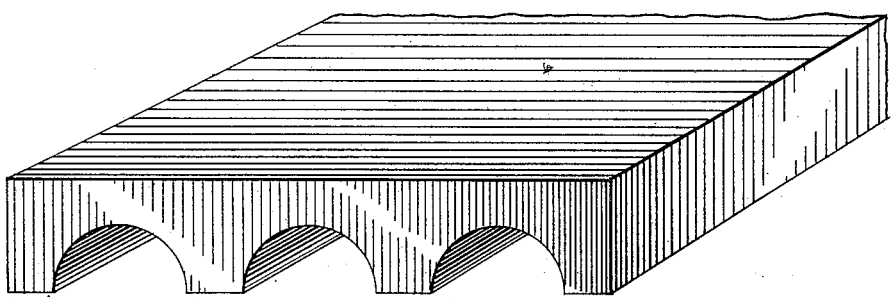
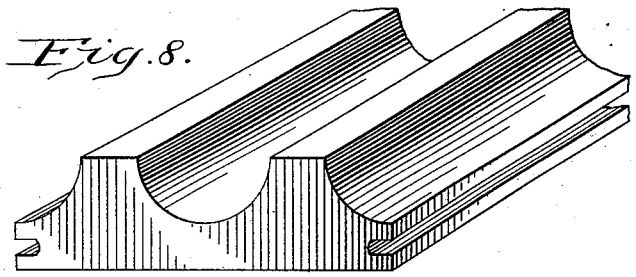
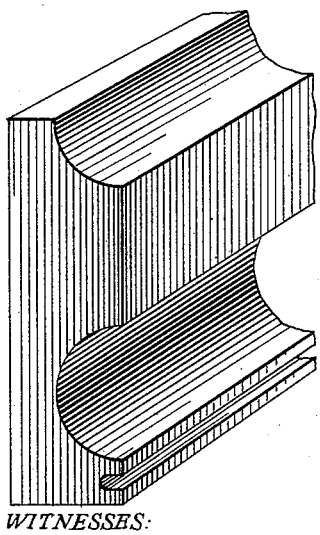
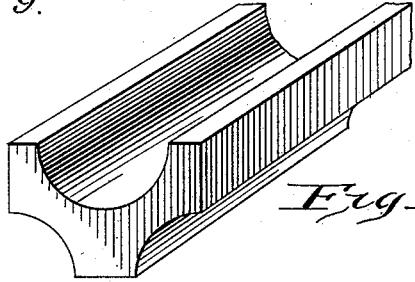

(No Model.) 5 Sheets—Sheet 5.

W. L. PARSLEY.
SUBWAY FOR ELECTRIC CABLES.

No. 431,780. Patented July 8, 1890.

WITNESSES:

INVENTOR.
Walter L. Parsley.
BY
Hopkins & Atkins.
ATTORNEY.

UNITED STATES PATENT OFFICE.

WALTER L. PARSLEY, OF WILMINGTON, NORTH CAROLINA.

SUBWAY FOR ELECTRIC CABLES.

SPECIFICATION forming part of Letters Patent No. 431,780, dated July 8, 1890.

Application filed February 18, 1890. Serial No. 340,916. (No model.)

*To all whom it may concern:*

Be it known that I, WALTER L. PARSLEY, of Wilmington, county of New Hanover, and State of North Carolina, have invented a certain new and useful Subway or Conduit for Underground Cables or Wires, of which the following is a specification, reference being had to the accompanying drawings.

The object of my invention is to provide a subway composed of fitting pieces of timber or other material each having one or more longitudinal channels and adapted to be laid together to form a nest of conduits for cables, so that when it is desired to replace, remove, or repair one of the lower cables it will not be necessary to remove all of the upper timbers in order to reach the lower cable. I provide channeled outside or frame pieces and channeled central pieces to be enveloped by the frame-pieces, as described below, and by this means I can form a nest of any desired number of conduits, in which only the minimum amount of timber is used, all boring is avoided, and only the minimum disturbance of the parts for repairs, &c., will in practice be required.

Heretofore subways for electric conductors have been formed of channeled timbers in various ways, as shown, for example, in United States Patents No. 243,215, No. 297,183, and No. 379,408; but in all heretofore, so far as I am aware, the convenient, economical, and secure plan furnished by my improvements has not been manifested.

Figure 1:
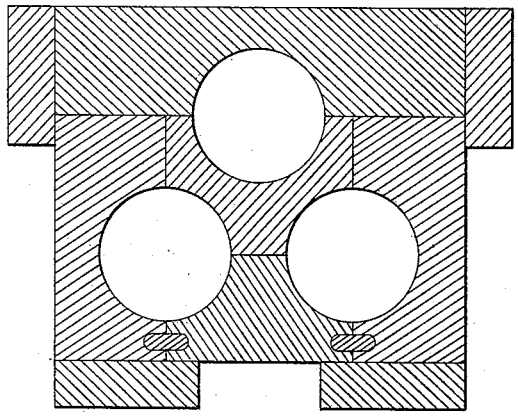
Figure 2:
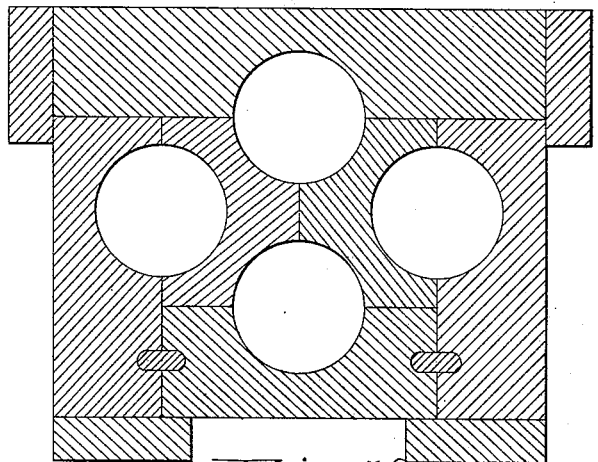
Figure 12:
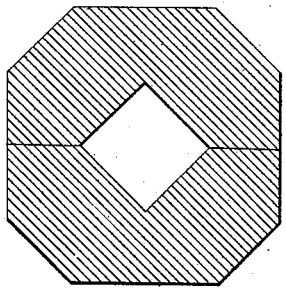
Figure 3:
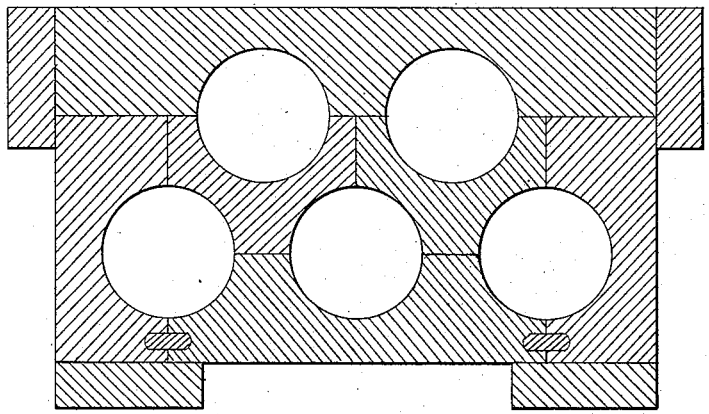
Figure 4:
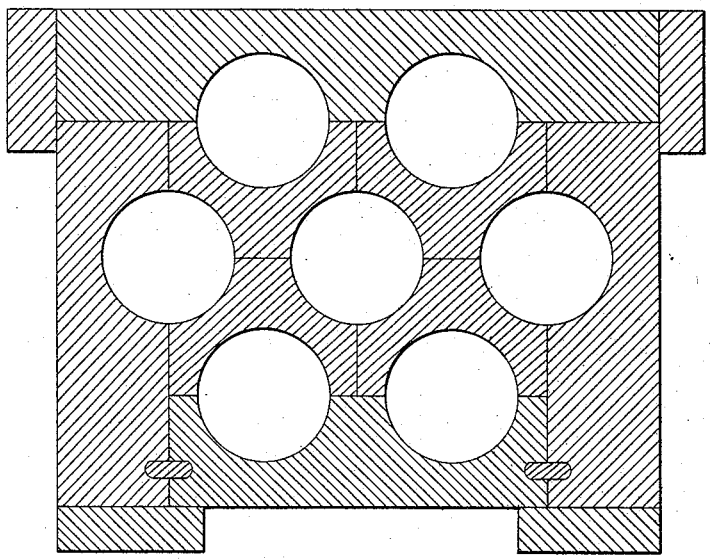
Figure 5:
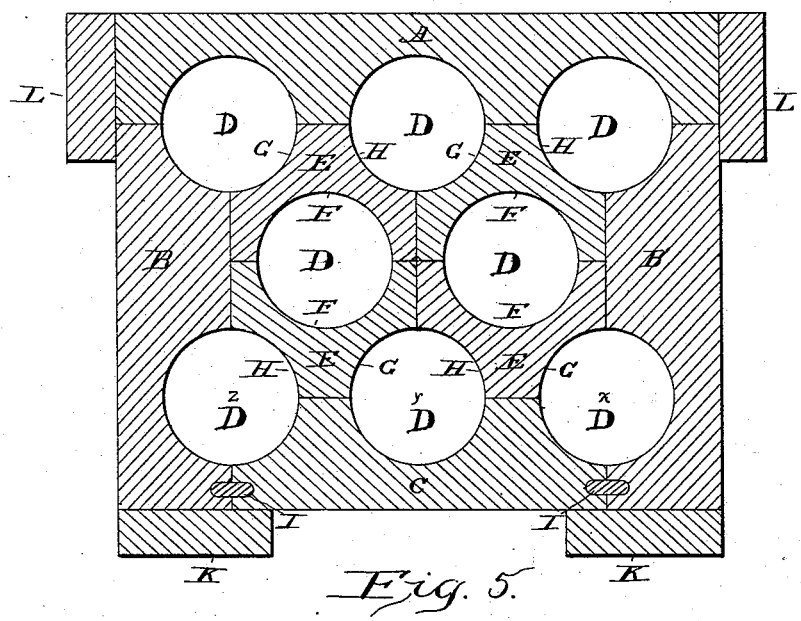
Figure 6:
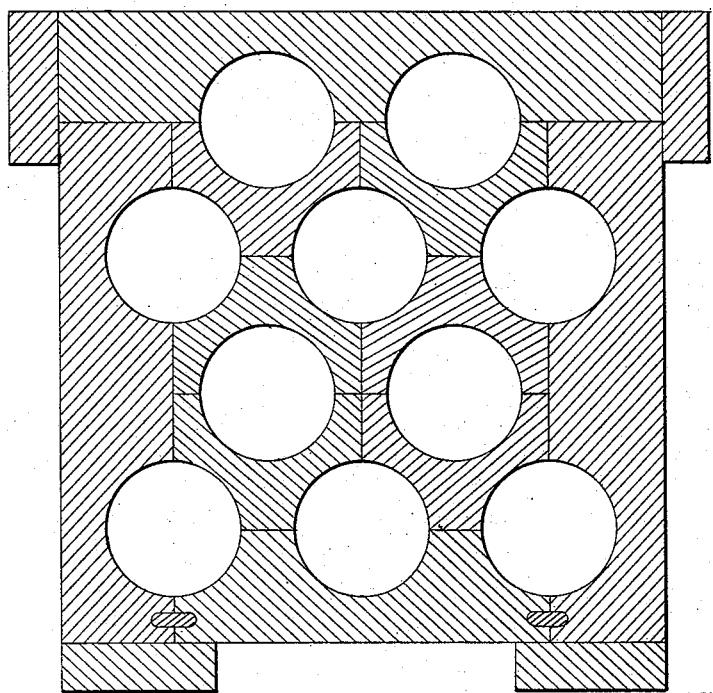
Figure 11:
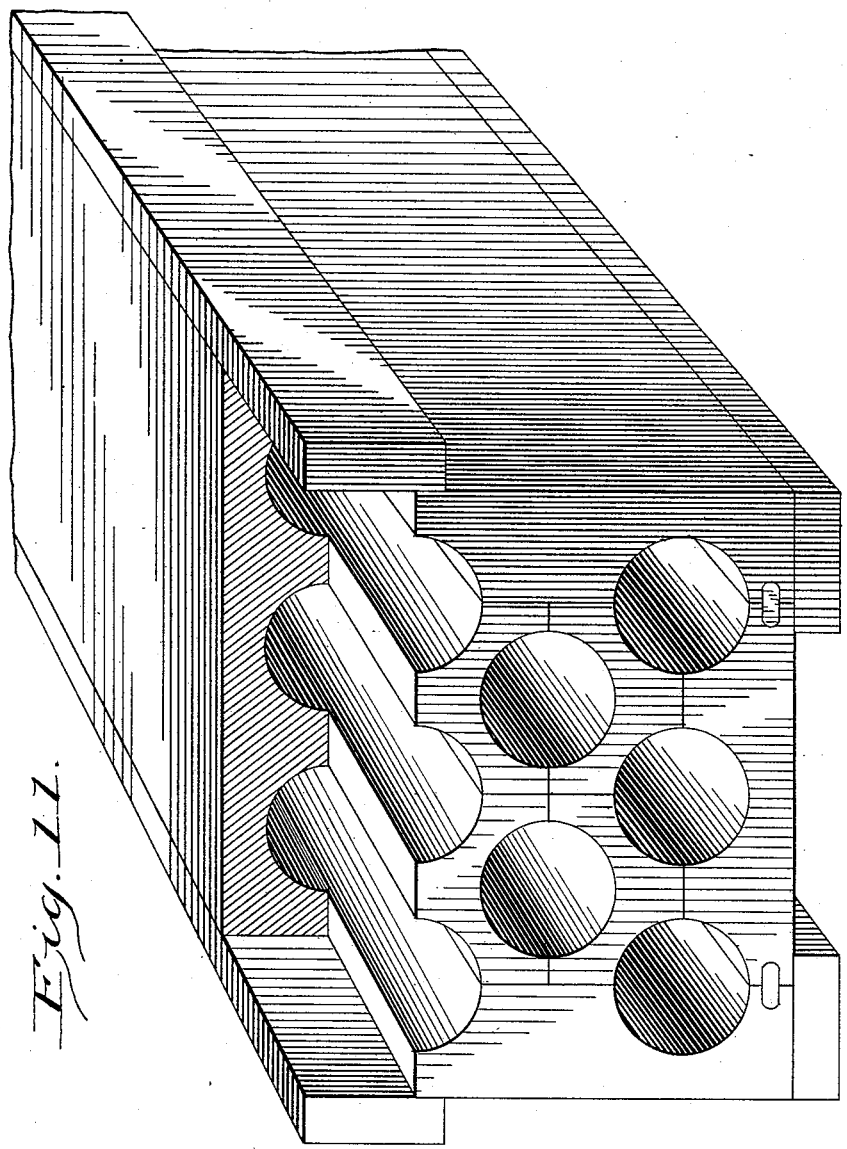

Referring to the drawings, Figure 1 is a transverse sectional view of a nest of three conduits; Fig. 2, of four conduits; Fig. 3, of five conduits; Fig. 4, of seven conduits; Fig. 5, of eight conduits, and Fig. 6 of ten conduits. Nests of conduits containing any other number desired may be made upon the same plan. Fig. 7 is a view of the top timber detached from the nest shown in Fig. 5. Fig. 8 is a view of the bottom timber detached from the nest shown in Fig. 5. Fig. 9 is a view of one of the side timbers, which are just alike, detached from Fig. 5. Fig. 10 is a view of one of the four central timbers, which are just alike, detached from Fig. 5; and Fig. 11 is a perspective view, partly in section. Fig. 12 shows a formal modification, in which the channel lines are straight instead of curvilinear in cross-section.

Referring to the letters upon Fig. 5 of the drawings, which it will be sufficient to describe in detail, A indicates the top timber, B B' the side timbers, and C the bottom timber of a nest of eight conduits D.

E indicates the central timbers, (which might be glass or earthenware,) each of which, like each of the central timbers in all the other figures, is provided with three channels—one semicircular channel F and two other quarter-circular channels G H.

In the bottom timber of Fig. 1 no semicircular channel is shown, because the nest of three conduits is so small (rarely ever made in practice) that no semicircular channel is needed.

I indicates keys or splines inserted in suitable grooves to connect the channeled bottom and the side timbers.

K K indicate sleepers or planks to cover the joints between the bottom and side timbers.

L L indicate planks to cover the joints between the top and side timbers.

Suppose it is desired to get access to the lower conduit marked $x$, Fig. 5. It will only be necessary to move the top timber and the two central timbers over the conduit marked $x$. The same operation will give access to the lower conduit marked $y$, and a similar operation at the other side will give access to the lower conduit marked $z$ or to the one marked $y$. This plan forms a most compact and convenient nest of conduits, the outside or frame pieces forming, like the center pieces, parts of the walls of the conduits; but all of the center pieces can be reached to get at the wires without breaking the joints of the outside casing further than is necessary to remove the top piece.

What I claim is—

1. A nest of conduits composed of frame-timbers having longitudinal conduit-channels and one or more central timbers, each having longitudinal quarter-circular conduit-channels and a longitudinal semicircular or half conduit-channel, all the timbers being laid together to form longitudinal openings or conduits, substantially as set forth.

2. As a new article of manufacture, a conduit-timber E, having a longitudinal semi-circular or half conduit-channel F, and the two longitudinal quarter-circular channels G and H, substantially as described.

In testimony of all which I have hereunto subscribed my name.

WALTER L. PARSLEY.

Witnesses:
 DANIEL F. BARNES,
 FURNEY J. GOSLING.